United States Patent
Donderici et al.

(10) Patent No.: US 12,448,880 B2
(45) Date of Patent: Oct. 21, 2025

(54) CALIBRATING ELECTROMAGNETIC CORROSION DETECTION TOOLS VIA CORE SATURATION

(71) Applicant: Halliburton Energy Services, Inc., Houston, TX (US)

(72) Inventors: Burkay Donderici, Houston, TX (US); Ahmed E. Fouda, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 42 days.

(21) Appl. No.: 17/723,241

(22) Filed: Apr. 18, 2022

(65) Prior Publication Data
US 2022/0243577 A1   Aug. 4, 2022

Related U.S. Application Data

(62) Division of application No. 16/077,486, filed as application No. PCT/US2017/036461 on Jun. 8, 2017, now Pat. No. 11,306,577.

(51) Int. Cl.
*E21B 47/00* (2012.01)
*G01N 17/04* (2006.01)
*G01N 27/90* (2021.01)

(52) U.S. Cl.
CPC ........... *E21B 47/006* (2020.05); *G01N 17/04* (2013.01); *G01N 27/90* (2013.01)

(58) Field of Classification Search
None
See application file for complete search history.

(56) References Cited

U.S. PATENT DOCUMENTS

| | | | |
|---|---|---|---|
| 3,056,920 A | 10/1962 | Herrald | |
| 4,071,815 A * | 1/1978 | Zemanek, Jr. | G01V 3/26 324/346 |
| 4,292,589 A | 9/1981 | Bonner | |
| 6,291,992 B1 | 9/2001 | van Andel et al. | |
| 6,359,438 B1 * | 3/2002 | Bittar | G01V 3/24 324/369 |
| 7,652,478 B2 | 1/2010 | Pelegri | |

(Continued)

FOREIGN PATENT DOCUMENTS

| | | | |
|---|---|---|---|
| CN | 104167830 A | * 11/2014 | |
| CN | 115308651 A | * 11/2022 | G01R 33/04 |

(Continued)

OTHER PUBLICATIONS

Translation of CN 104167830A (Year: 2014).*

(Continued)

*Primary Examiner* — Jermele M Hollington
(74) *Attorney, Agent, or Firm* — John Wustenberg; Parker Justiss, P.C.

(57) ABSTRACT

Methods and devices used to calibrate EM corrosion detection tools may estimate the effects of the presence of a core on measurements to enable more accurate corrosion detection in the well line. The methods may involve sending voltages to a core of a well tool disposed in the well line to obtain signals while the core is in a saturated and unsaturated state. Subsequent measurements using the core may be calibrated using a constant resulting from the division of the signals achieved at the core in the saturated and unsaturated states.

18 Claims, 10 Drawing Sheets

(56) References Cited

U.S. PATENT DOCUMENTS

| | | | |
|---|---|---|---|
| 7,960,969 B2 | 6/2011 | Mouget et al. | |
| 8,165,825 B2 | 4/2012 | Legendre et al. | |
| 8,305,083 B2 | 11/2012 | Wang | |
| 8,958,989 B2 | 2/2015 | Legendre et al. | |
| 10,393,703 B2 * | 8/2019 | Fouda | E21B 47/00 |
| 10,823,873 B2 * | 11/2020 | Fouda | G01V 3/38 |
| 11,174,725 B2 * | 11/2021 | Khalaj Amineh | G01V 3/34 |
| 11,306,577 B2 * | 4/2022 | Donderici | G01N 17/006 |
| 2004/0239345 A1 * | 12/2004 | Amini | G01B 7/105 |
| | | | 324/702 |
| 2005/0088180 A1 | 4/2005 | Flanagan | |
| 2009/0091328 A1 | 4/2009 | Clark | |
| 2010/0033187 A1 * | 2/2010 | Reiderman | G01V 3/28 |
| | | | 324/346 |
| 2013/0193953 A1 | 8/2013 | Yarbo et al. | |
| 2015/0127274 A1 | 5/2015 | Legendre et al. | |
| 2015/0241596 A1 | 8/2015 | Donderici | |
| 2016/0168975 A1 | 6/2016 | Donderici et al. | |
| 2016/0245779 A1 | 8/2016 | Khalaj Amineh et al. | |
| 2016/0349405 A1 | 12/2016 | San Martin et al. | |
| 2017/0075023 A1 | 3/2017 | Fouda et al. | |
| 2017/0248728 A1 | 8/2017 | Fouda et al. | |
| 2017/0248730 A1 | 8/2017 | San Martin et al. | |
| 2017/0269253 A1 | 9/2017 | Fouda et al. | |
| 2017/0292365 A1 | 10/2017 | Khapochkin | |
| 2018/0106141 A1 | 4/2018 | Fouda et al. | |
| 2018/0106763 A1 | 4/2018 | Fouda et al. | |
| 2018/0106764 A1 | 4/2018 | Fouda et al. | |
| 2018/0172872 A1 | 6/2018 | Fouda et al. | |
| 2018/0209265 A1 | 7/2018 | Fouda et al. | |
| 2018/0335541 A1 | 11/2018 | Donderici et al. | |
| 2019/0369285 A1 * | 12/2019 | Fouda | G01V 3/10 |

FOREIGN PATENT DOCUMENTS

| | | |
|---|---|---|
| GB | 2462193 | 2/2010 |
| WO | 2016007883 | 1/2016 |

OTHER PUBLICATIONS

Translation of CN 115306851A (Year: 2022).*

Acuña, Irlec Alexandra, et al. "Scanning for Downhole Corrosion." Oilfield Review 22.1 (2010): 42-50.

Brill, et al., "Electromagnetic Casing Inspection Tool for Corrosion Evaluation", https://www.onepetro.org, 2011, pp. 1-14.

Rourke, Marvin, Yong Li, And Glyn Roberts. "Multi-tubular corrosion inspection using a pulsed eddy current logging tool." IPTC 2013: International Petroleum Technology Conference. 2013.

* cited by examiner

```
                    ┌─────────────────────────────────────┐
                    │  Apply DC Bias To Saturate The Core │
      200           │                 205                 │
                    └─────────────────┬───────────────────┘
                                      ▼
        ┌──────────────────────────────────────────────────────┐
        │ Log A Section Of The Pipe With Saturated Core m_{core, sat} │
        │                         210                          │
        └─────────────────────────┬────────────────────────────┘
                                  ▼
                    ┌─────────────────────────┐
                    │      Remove DC Bias     │
                    │           215           │
                    └────────────┬────────────┘
                                 ▼
                    ┌─────────────────────────┐
                    │ Apply Demagnetizing Current │
                    │           220           │
                    └────────────┬────────────┘
                                 ▼
```

Log The Same Section Of The Pipe With Saturated Core $m_{core}$
225

Compute Calibration Weights $$W_{cal} = \frac{(m_{core,sat})}{(m_{core})}$$

230

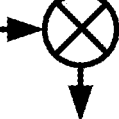

Further Processing; Estimate Pipes Permeability, Resolution-Enhancement, Inversion
235

FIG. 2

CALIBRATING ELECTROMAGNETIC CORROSION DETECTION TOOLS VIA CORE SATURATION

CROSS-REFERENCE TO RELATED APPLICATION

This application is a divisional of application Ser. No. 16/077,486 filed on Aug. 13, 2018, now U.S. Pat. No. 11,306,577, entitled "CALIBRATING ELECTROMAGNETIC CORROSION DETECTION TOOLS VIA CORE SATURATION," which is the National Stage of, and therefore claims the benefit of, International Application No. PCT/US2017/036461 filed on Jun. 8, 2017, entitled "CALIBRATING ELECTROMAGNETIC CORROSION DETECTION TOOLS VIA CORE SATURATION," which was published in English under International Publication Number WO 2018/226226 on Dec. 13, 2018. Both of the above applications are commonly assigned with this National Stage application and are incorporated herein by reference in their entirety.

TECHNICAL FIELD OF THE DISCLOSURE

This disclosure relates to a method for calibrating the effect of magnetic cores used in the transmitting/receiving coils of electromagnetic (EM) corrosion detection tools.

BACKGROUND

Early corrosion detection in well casings is among one of many considerations to ensure integrity and/or safety of a well.

State-of-the-art methods for downhole corrosion detection involve running corrosion detection tools in the production tubing. Different types of corrosion detection tools include mechanical calipers, ultrasonic acoustic tools, cameras, electromagnetic flux leakage, and electromagnetic induction tools. Of the various state-of-the-art tools, only electromagnetic induction tools can be used to detect corrosion in outer casings beyond that in which the tool is run.

Existing electromagnetic (EM) induction corrosion detection tools comprise at least one transmitting coil and at least one receiving coil. The transmitting coil induces eddy currents inside the metallic pipes, and the receiving coil receives secondary fields generated from the pipes. Those secondary fields bear information about the electrical properties and metal content of the pipes and can be processed (e.g., by inversion) for detecting any corrosion or loss in the metal content of the pipes.

Inversion refers to a technique used to produce a characteristic sample of voltages indicative of the thickness of each component of a well system, which may include casings, tubings, pipes, and other well bore work components (components of the "well line"). Often, the voltages recorded may involve different receivers and be obtained at different frequencies. By compiling a collection of voltage data indicative of the thickness of portions of the well line, other aspects of the well components may be observed and/or estimated, such as defected sections, the size of the defect, and the amount of metal loss. Model-based inversion aims at finding the optimum thickness and the relative permeability of each section of the well line that minimizes the misfit between EM induction tool measurements and synthetic data generated using a computer model that simulates the tool and the well casings.

EM induction tools can be frequency-domain tools that operate at discrete sets of frequencies (higher frequencies to inspect inner pipes and lower frequencies to inspect outer pipes). An example for this is the EM Pipe Scanner tool offered by Schlumberger Limited of Houston, Texas. Alternatively, EM induction tools can operate in the time-domain by transmitting transient pulses and measuring the decay response versus time (earlier time corresponds to inner pipes and later time corresponds to outer pipes). An example for this is the EM Defectoscope offered by GOWell Petroleum Equipment Co. Ltd. of Houston, Texas. These tools are referred to as pulsed eddy current corrosion detection tools.

Transmitter (and sometimes receiver) coils in EM corrosion detection tools are wrapped around cores made of magnetic materials which have high magnetic permeability. The use of magnetic cores boosts the signal to noise ratio (SNR), and reduces cross-talk between different channels (receivers/frequencies). However, the effect of the core on the signal level has to be calibrated for at least the following reasons.

First, calibration enables the use of fast synthetic models in inversion. In order to detect possible defects in the pipes from receiver voltage measurements, an inversion algorithm is applied to find the optimum thickness and relative permeability of each pipe. The inversion algorithm minimizes the misfit between measurements at each depth and synthetic data generated using a computer model. Usually radial 1-dimensional ("R-1D") models are used since they are much faster than 2-D models, which implement a core. However, R-1D models cannot account for 2-D features in the tool, such as the presence of a magnetic core inside the transmitter and/or receiver coils. Thus, calibration is required to compensate for the effect of the core.

Second, good characterization of the magnetic permeability of the core is not always possible due to the non-linear behavior of magnetic materials. The permeability of the core depends on the strength of the magnetic field penetrating the core, which can be dependent on geometrical and electrical properties of the pipes inside which the tool logs.

Other related calibration tools for use in ferromagnetic material EM corrosion detection applications include those disclosed in U.S. Pat. Nos. 8,958,989, 4,292,589, and in the following literature: M. Rourke, Y. Li, G. Roberts, "Multi-tubular corrosion inspection using a pulsed eddy current" IPTC 16645, 2013 and Acuña, Irlec Alexandra, Alan Monsegue, Thilo M. Brill, Hilbrand Graven, Frans Mulders, Jean-Luc Le Calvez, Edward A. Nichols, Fernando Zapata Bermudez, Dian M. Notoadinegoro, and Ivan Sofronov. "Scanning for downhole corrosion." Oilfield Review 22, no. 1 (2010): 42-50, each of the foregoing being incorporated herein by reference in its entirety.

However, while existing calibration techniques may be suitable for their intended purposes, a need exists for an improved method and system for calibrating EM corrosion detection tools.

BRIEF DESCRIPTION OF THE DRAWINGS

FIG. 2 is an exemplary workflow according to disclosed embodiments.

Figure 1B:
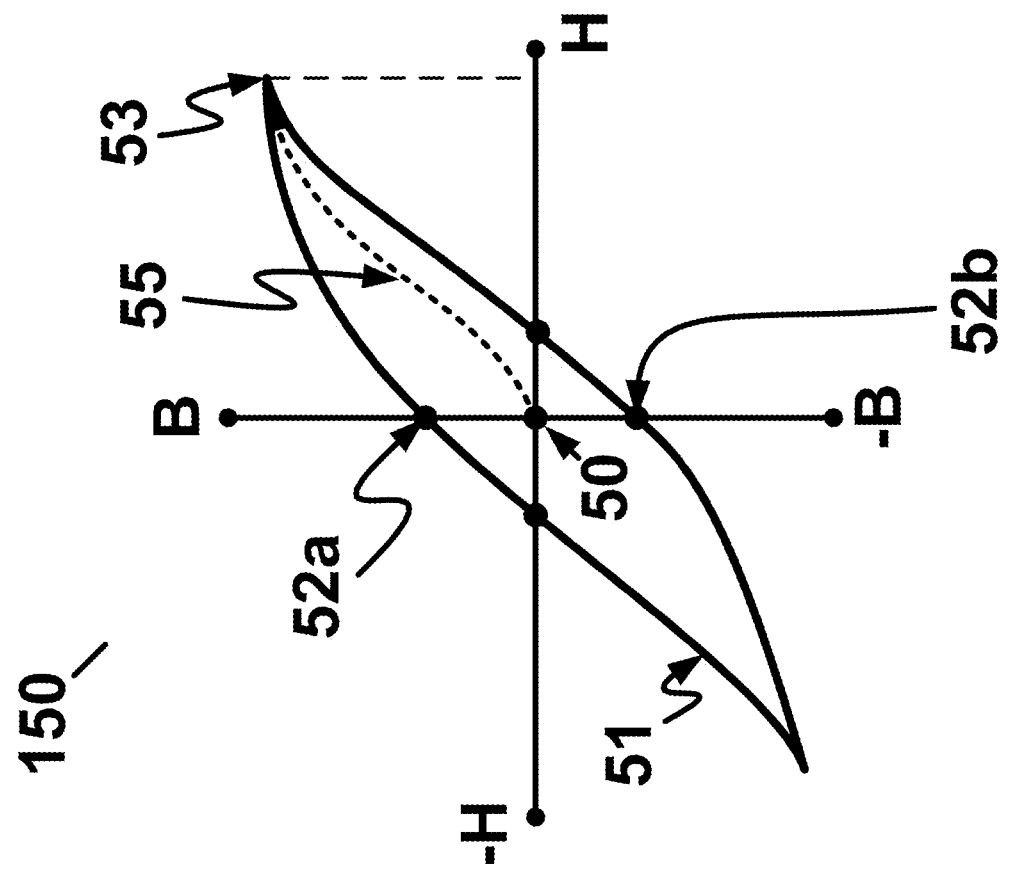
FIG. 1B is an exemplary magnetic hysteresis loop of a core material.

In the drawings like characters of reference indicate corresponding parts in the different figures. The drawing figures, elements and other depictions should be understood as being interrelated and interchangeable and may be combined with and/or modified in view of one another, reorganized with respect to one another, and otherwise changed in any manner to achieve one or more of the desired objectives disclosed in any like manner consistent with the disclosures and objectives recited herein.

DETAILED DESCRIPTION

The methods and devices disclosed herein may be used to calibrate EM corrosion detection tools that employ magnetic cores to boost signal-to-noise ratio. In general, the methods and devices derive a calibration weight or coefficient from logs made while the tool is operating in saturation mode and in normal operation mode. The saturation mode log can be considered equivalent to a log made by a tool that does not use a magnetic core (i.e., an air-core based tool). In some embodiments, the calibration weight is derived by taking the ratio of the saturated mode log over the normal mode log averaged over a given section of casing. The calibration weight may thereafter be applied to measurements made by the tool to factor out the effect of the magnetic core. The devices and methods herein may be employed inside the well line (in situ calibration), for example, in wireline-based applications. Such devices and methods may be used in conjunction with exemplary downhole tools, including wired drill pipe, coiled tubing (wired and unwired), wireline, slickline, and downhole tractor and other downhole conveyances. While the devices and methods disclosed herein may be particularly useful in well bores, their use may also encompass other applications, include those involving subsea/offshore applications.

In some embodiments, the disclosed methods and devices may be used to estimate the effects of the presence of a core on erosion detection measurements without a priori knowledge of well pipe properties, such as, for example, nominal thickness of the pipe(s). For reference, the core is designated at 10, 305, 310, and 410 in FIGS. 1A, 3A, 3B, and 4, respectively. Additionally, the disclosed methods and devices may enable more accurate corrosion detection via use of a system involving calibration factors obtained by use of a magnetic core. In an exemplary embodiment, the disclosed methods and devices may estimate the effect of a core on erosion detection measurements without having to solve an inversion problem and therefore avoids non-uniqueness issues associated with under-determined inversion problems.

Figure 1A:
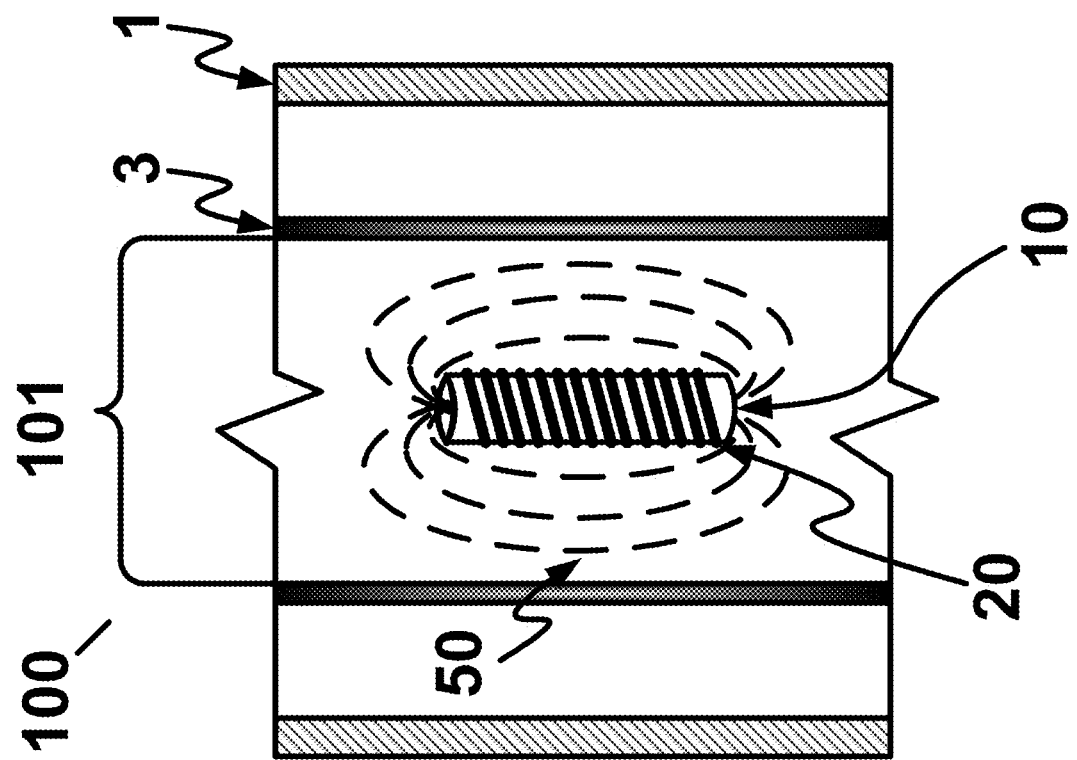
FIG. 1A is an exemplary sectional view of a corrosion detection tool transmitter.

Referring to FIG. 1A, a well work site 100 may comprise a casing string 1, a tubular string 3, and a corrosion detection system 101 disposed within the work site 100. The casing string 1 and tubular string 3 may be a portion of a well line. The detection system 101 may comprise a core 10 with one or more coils 20 wrapped about the surface of the core. Such a system 101 may be standalone system or it may be a part of more comprehensive tool. The exemplary core 10 may possess relative magnetic permeability (hereinafter "permeability") in the range of about 70 to about 300 or higher in some cases. In another exemplary embodiment, the core 10 may be made of a magnetic material or possess magnetic properties. The exemplary core 10, as well as any other core described or disclosed herein, may have any shape and be comprised of conductors and insulators. In one example, the core 10 may be made of laminated magnetic materials.

FIG. 1B illustrates an exemplary relationship between magnetic flux density (B) and magnetic field intensity (H), also known to those skilled in the art as a magnetic hysteresis loop 51, that may be present in a system 101. Increases in magnetization current (I) through the coils 20 about the core 10 of a system 101 in the positive direction will increase the B and H values of the system 101 in a substantially linear fashion towards point 53. In an exemplary system 101 having a hysteresis loop 51, point 53 may also be the point at which the core 10 becomes saturated, e.g., the saturation point. Following saturation, the current in the coils 20 of the system 101 may be decreased so as to reduce the H value of the system 101 to zero, indicated by point 50. However, due to residual magnetism in the core 10 of system 101, the magnetic flux (or B value) reduces only to point 52a. A similar effect may also be seen at point 52b in hysteresis loop 51.

Due to the behavior illustrated in FIG. 1B, measurements derived from use of the system 101 to detect thicknesses of the casing string 1 and tubing 3 in the work site 100 may vary between casing sections and may also vary based on the presence of the core 10 in such a casing section. Thus, calibration may be required to accommodate for the effects of the core 10.

In the above example, it is assumed the permeability of the core 10 at point 52a is large enough to enable normal operation of the system 101, that is, when core 10 is not saturated. When the permeability of the core 10 at point 52a is sufficiently large, an exemplary normal (non-saturated) operation may be achieved by generating a field intensity equal to zero, such as in the case where the core 10 may be comprised of soft ferromagnetic materials. Such materials are known to those skilled in the art as having narrow magnetic hysteresis loops and relatively small amounts of residual magnetism. It is noted here that the magnetizing field is typically chosen to be a static field or very low frequency (typically smaller than 1 Hz). In an exemplary embodiment, core 10 may be comprised of iron. In another exemplary embodiment, core 10 may be comprised of silicon steel.

Where the core 10 may comprise materials that are harder ferromagnetic materials, e.g., those with larger amounts of residual magnetism and/or wider hysteresis loops, a core demagnetization procedure may be used to move the operating point on the respective hysteresis loop 51 from point 53 where the core 10 is saturated to point 50 via operating curve 55.

Demagnetization may be carried out in several ways, among which is AC demagnetization. An exemplary form of AC demagnetization may include alternating the magnetization of the core 10 by an alternating magnetic field having an amplitude that decreases smoothly to zero. Here, the maximum value of the amplitude of the alternating demagnetizing field should generally be no less than that of the magnetizing field. The effectiveness of the demagnetization may depend on the frequency of the demagnetizing field, the rate of decrease of the field, the thickness of the component being demagnetized, and/or the depth of penetration of the field. In one example, the thicker the core 10, the lower the frequency of the demagnetizing field. The higher the permeability of the core 10 material, the lower the rate of demagnetization. In other words, when the number of demagnetization cycles increases, the core 10 may experience a lower rate of demagnetization.

In an exemplary embodiment, a material composed of plates of electrical sheet steel of about 0.35 mm to about 0.5 mm thick may be used as the core 10. Such a material may be demagnetized by smoothly decreasing a 50-hertz magnetic field from a maximum field strength of 2,000-2,500 amperes/m to about 0 amperes/m in about one minute. According to this embodiment, about 30 to about 60 alternating magnetization cycles are generally sufficient for demagnetization.

FIG. 2 depicts an exemplary calibration method 200 according to the disclosed embodiments. In the exemplary calibration method 200 of FIG. 2, the system 101 may be operated in two modes: a saturation mode and a normal operation mode. In the exemplary saturation mode, as may be achieved at step 205, a DC bias is applied in addition to an AC voltage to the core 10 to drive the core 10 into saturation, e.g., point 53 in FIG. 1B. The permeability of the exemplary core 10 at such a saturation point, e.g., point 53 in FIG. 1B, may be substantially the same as that of air.

When core 10 achieves a permeability substantially the same as that of air, the system 101 may log or store the saturation mode voltage measurements $m_{core,sat}$, for example, as digital, analog, or other data forms known to those skilled in the art (e.g., in a data acquisition field) at step 210. These voltage measurements are effectively equivalent to (substantially the same as) voltage measurements made with an air-core based tool (i.e., the measurements may exhibit low signal to noise ratio and/or non-negligible crosstalk between different receiver/frequency channels). Nevertheless, an average, mean, or mode taken over a section of the casing string 1 may still be used as an estimate of the measurements made by air-core based tool for a given section of the casing string 1.

An exemplary normal mode may be achieved by removing the DC bias to the system 101 to reduce the current at step 215. In an exemplary embodiment, the system 101 will operate at point 52a along the hysteresis loop 51 when the DC bias is removed following saturation at point 53. The normal mode voltage measurements $m_{core}$ may then be acquired and stored as a second set of measurements in same or like manner to that of the saturation mode voltage measurements $m_{core,sat}$ at step 225. In similar manner, an exemplary embodiment may determine an average, mean, or mode for the normal mode log taken over the same section of the casing string 1.

To calibrate the system 101 to take into account the residual magnetism of the core 10, a calibration weight or coefficient $W_{cal}$ may be calculated at step 230. In some embodiments, the calibration weight $W_{cal}$ may be calculated as a ratio between the saturated mode measurements averaged over a section of the casing string 1 $\langle m_{core,sat} \rangle$ over the normal mode measurements averaged over the same section of casing string 1 $\langle m_{core} \rangle$:

$$W_{cal} = \frac{\langle m_{core,sat} \rangle}{\langle m_{core} \rangle}$$

A plurality of calibration weights $W_{cal}$ may be obtained, for example, over a plurality of casing sections, respectively, using the above equation. The calibration weights $W_{cal}$ may then be stored, for example, in a suitable computer-readable medium (not expressly shown), such as a volatile memory, nonvolatile memory, optical memory, magnetic memory, and the like.

With one or more of the calibration weights thus obtained, the calibration weights may be applied to the voltage measurements $m_{core}$ obtained by the system 101 for the respective section of casing string 1 when the core 10 is unsaturated to obtain calibrated measurements, $m_{cal}$. The calibration weights may be applied via point-wise multiplication, for example:

$$m_{cal} = W_{cal} \times m_{core}$$

In the above equation, $m_{cal}$ represents any measurement $m_{core}$ acquired with an unsaturated core 10 (i.e., measurements characterized by high signal-to-noise ratio and low cross-talk) that has been calibrated to factor out the effect of the core 10 on signal levels.

The calibrated measurements $m_{cal}$ may then be used in inversions processes that typically employ an air-core model of the well tool to detect corrosion and determine other well site 100 properties. In an exemplary embodiment, the inversion process may be one that uses an R-1D solver known to those skilled in the art.

In an exemplary embodiment, the saturated mode voltage measurements may be acquired as the system 101 is being lowered into the casing string 1, and the normal mode voltage measurements may be acquired as the system 101 is being retrieved from the casing string 1. In another exemplary embodiment, the normal mode voltage measurements may be acquired as the system 101 is being lowered into the casing string 1, and the normal mode voltage measurements may be acquired as the system 101 is being retrieved from the casing string 1. In either of the foregoing exemplary embodiments, calibration weights $W_{cal}$ may be generated for each section of the casing 3 where such voltages were measured. As well, in some embodiments, the saturated mode voltage measurements may be acquired ahead of time in anticipation of future system 101 use.

In another exemplary embodiment, following calibration (step 235), the voltages measured via an exemplary system 101 may include further processing steps such as, for example, estimating casing string 1 or tubing string 3 permeability from a baseline voltage measurement. In one example, the baseline measurement can be obtained by taking the average, mean, or mode of voltages measured over the entire length or sufficiently long section of the casing string 1 or tubing string 3. The baseline measurement helps minimize the effect of present defects and/or enable the identification of non-defected sections. In another example, a different baseline measurement may be selected for each joint of casing string 1 and/or tubing string 3. In another example, a baseline measurement calculated from a joint of casing string 1 and/or tubing string 3 may be used to evaluate another joint of casing 1 and/or tubing 3. A histogram of the received signal within each joint of casing 1 and/or tubing 3 may be used to identify the baseline (as an exemplary point 53 in exemplary histogram 51).

Note that in the exemplary method of FIG. 2, upon removal of the DC bias from the core, demagnetization of the core may be accomplished without introducing a demagnetization current as per step 220. This may apply where the composition of the core and/or magnitude of the bias voltage may not require a self-demagnetization current.

The exemplary steps provided in FIG. 2 and otherwise disclosed may be conducted by suitable computer-aided machinery known to those skilled in the art, and may be performed on the surface or downhole via appropriate processor-based computer mediums, known to those skilled in the art.

The embodiments disclosed herein may also be used to enhance resolution of the system 101 to remove ghost effects known to those skilled in the art. Such ghost effects may be more noticeable where the systems 101 are operating in frequency-domain tools and where the receivers have large spaces therebetween. Exemplary methods for improving the resolution of the voltages measured by a system 101 is disclosed in commonly-assigned applications entitled "Electromagnetic (EM) Defect Detection Methods and Systems with Enhanced Inversion Options" (U.S. application Ser. No. 15/533,349 filed on Jun. 5, 2017, now U.S. Pat. No. 10,533,411,) and "Thickness Value Restoration in Eddy Current Pipe Inspection" (U.S. application Ser. No. 16/467,644 filed on Jun. 7, 2019, now U.S. Pat. No. 11,346,813,), the disclosures of which being incorporated herein by reference in their entirety.

Figure 3A:
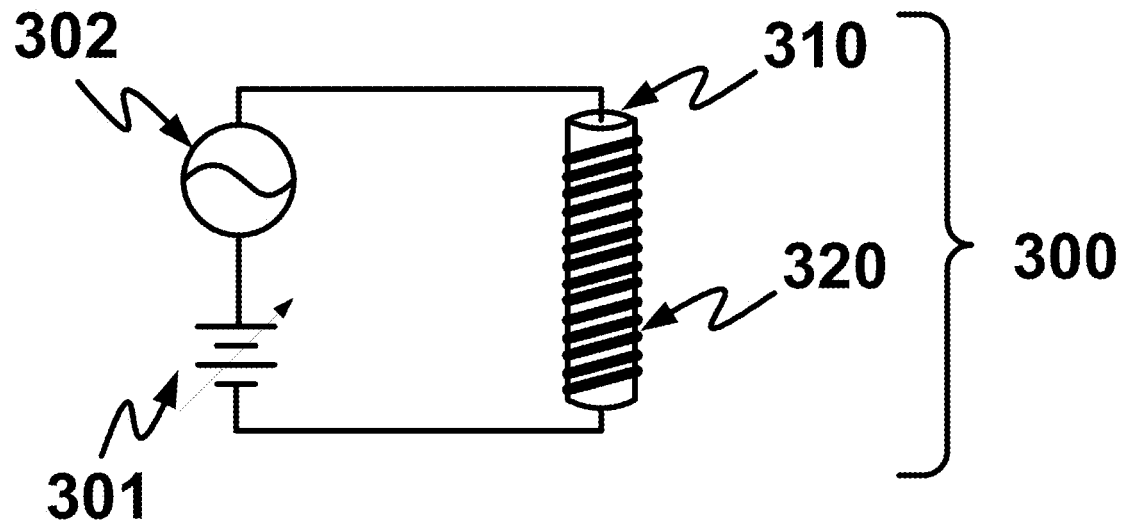
FIG. 3A is an exemplary schematic of an exemplary saturation circuit according to disclosed embodiments.
Figure 3B:
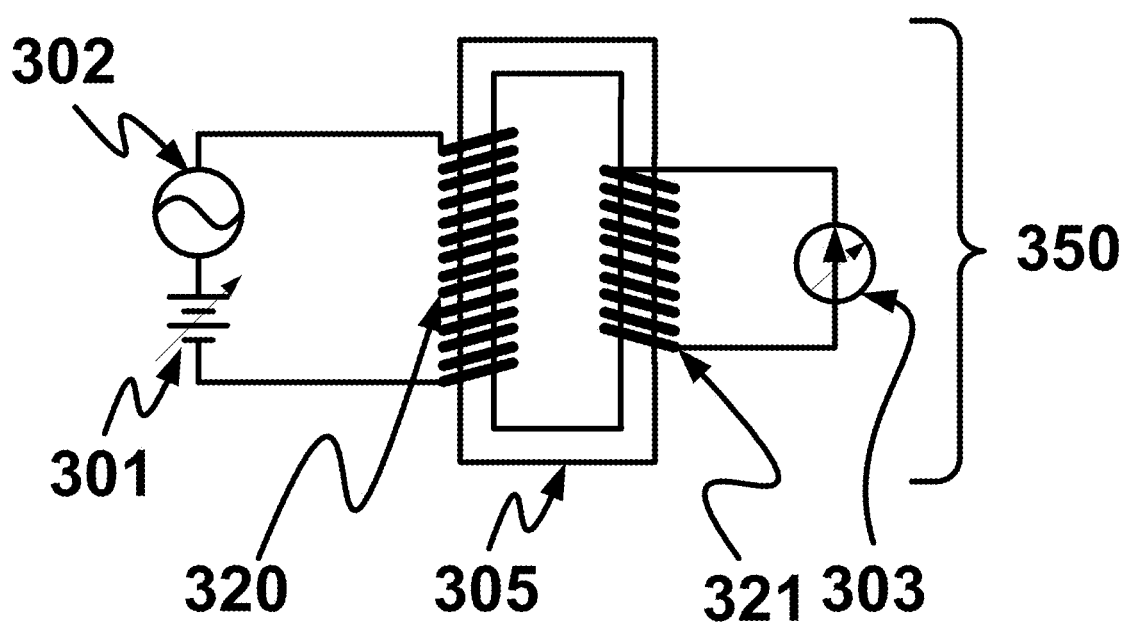
FIG. 3B is another exemplary schematic of an exemplary saturation circuit according to disclosed embodiments.

With reference to FIGS. 3A and 3B, two illustrative embodiments of a saturable core are observed that may be used to detect corrosion in accordance with the present disclosure. In the illustrative embodiment of FIG. 3A, a system 300 comprises an adjustable DC bias voltage 301 connected in series with an AC signal generator 302 that provides an AC voltage to core 310 about which is wrapped one or more coils 320. In this embodiment, as the DC bias voltage at 301 is increased, the current in the coil 320 increases and hence the magnetic field H increases. To drive the core into saturation, the DC bias voltage 301 may be adjusted so that the core 310, which may follow an exemplary hysteresis loop 51, is driven to a saturation point 53. As previously described, an exemplary normal mode for core 310 may be achieved by adjusting the bias voltage 301 to zero, e.g., obtaining an exemplary operation point 52a on the exemplary hysteresis loop 51.

In the illustrative embodiment of FIG. 3B, a DC bias current may be used instead of a DC bias voltage. In FIG. 3B, a system 350 may comprise a dual coil core 305 about which are two sets of coils 320 and 321. According to this exemplary embodiment, an adjustable DC bias current 303 may be inductively coupled with the AC signal generator 302 as shown. Accordingly, the core 305 may be driven into saturation, e.g., achieving an exemplary saturation point 53 on an exemplary hysteresis loop 51, by adjusting the bias current 303. To restore normal mode operation of system 350, the bias current may be set equal to zero.

According to either of the foregoing embodiments, other power conveying mechanisms may be substituted and their equivalents incorporated to achieve like results. For example, power may be sourced from batteries stored within the system 300, 350, or be conveyed from cables and electronics on the tool in which such systems 300, 350 may be found. Additionally, exemplary systems 300 and 350 may utilize AC and DC conversion tools to accommodate the power sources and the types of cores 305/310 that are utilized in the particular tool.

Figure 4:
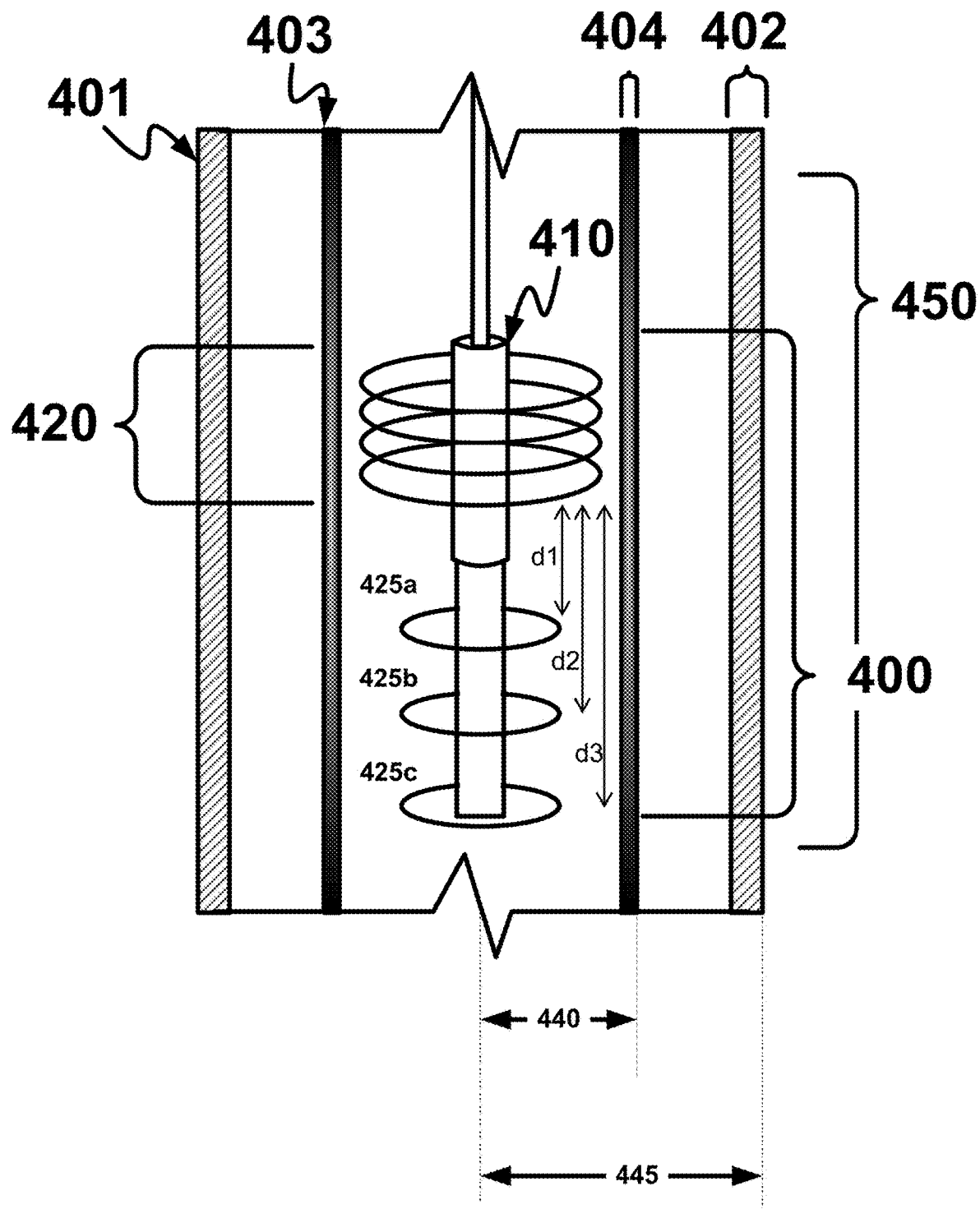
FIG. 4 is an exemplary diagrammatic representation of a corrosion detection tool in an exemplary operation in accordance with disclosed embodiments.

With reference to the illustrative embodiment of FIG. 4, an exemplary EM corrosion detection tool 450 may be situated in a length of casing 401 and a tubing 404, which may be components or sections of a well line. In this exemplary embodiment, the tool 450 may have an EM corrosion detection system 400 disposed thereon, the system 400 comprising one transmitting coil 420 about a core 410 and three receiving coils, 425a, 425b, and 425c. Each of the receiving coils are spaced by distances d1, d2, and d3 from the transmitting coil 420. Additionally, an axis of the core 410 may be located a distance 440 from the outer surface of the tubing 403 and a distance 445 from the outer surface of the casing 402. In an alternative embodiment, the core 410 may be in one or more of the transmitter coils 420 and at least one receiver coil 425a, 425b, and/or 425c. In another embodiment, the core 410 may be co-located within the same transmitter and/or receiver coil or may share one or more of the transmitter and/or receiver coil(s). In an exemplary embodiment, the core 410 may be dislocated from the receiver coils.

In the exemplary embodiment, the well tool 450 may have a core 410 with a relative permeability of 70, conductivity of 0.01 S/m, and outer diameter of 0.8 in. The receivers 425a, 425b, and 425c are without a core. The respective measurements for d1, d2, and d3 are 15 inches, 22 inches, and 30 inches. Measurements are performed at the following frequencies 0.1 Hz, 0.5 Hz, 1 Hz, 2 Hz, 4 Hz, 8 Hz, and 20 Hz. The tool 450 in this embodiment is run inside 3 concentric pipes having the following parameters in Table 1:

TABLE 1

| Pipe | 1 | 2 | 3 |
| --- | --- | --- | --- |
| Outer Diameter | 4.500 in | 7.000 in | 9.625 in |
| Thickness | 0.300 in | 0.400 in | 0.400 in |
| Relative Permeability | 82.0 | 76.0 | 85.0 |
| Defect(s) | None | None | 0.1 in. × 2 ft. (25%) |

Further according to this exemplary embodiment, the effect of the presence of core 410 on the baseline measurement may be shown in Table 2. The effect of the core is displayed as the ratio between a baseline measurement without core 410 (saturated core or "air core") and the actual baseline measurement in the presence of core 410:

TABLE 2

| | $\text{Abs}\left(\dfrac{m_{no\,core}}{m_{core}}\right)$ | | |
| --- | --- | --- | --- |
| | x1 (15 in.) | x2 (22 in.) | x3 (30 in.) |
| 0.1 Hz | 0.0302 | 0.0271 | 0.0263 |
| 0.5 Hz | 0.0302 | 0.0272 | 0.0264 |
| 1 Hz | 0.0302 | 0.0272 | 0.0264 |
| 2 Hz | 0.0303 | 0.0272 | 0.0264 |
| 4 Hz | 0.0305 | 0.0273 | 0.0265 |
| 8 Hz | 0.0312 | 0.0276 | 0.0267 |
| 20 Hz | 0.0342 | 0.0290 | 0.0271 |

| | $\text{Abs}\left(\dfrac{m_{no\,core}}{m_{core}}\right)$ [rad.] | | |
| --- | --- | --- | --- |
| | x1 (15 in.) | x2 (22 in.) | x3 (30 in.) |
| 0.1 Hz | −0.002 | −0.001 | −0.001 |
| 0.5 Hz | −0.010 | −0.006 | −0.005 |
| 1 Hz | −0.020 | −0.012 | −0.009 |
| 2 Hz | −0.040 | −0.025 | −0.018 |
| 4 Hz | −0.078 | −0.049 | −0.035 |
| 8 Hz | −0.147 | −0.093 | −0.065 |
| 20 Hz | −0.297 | −0.218 | −0.135 |

FIGS. 5-10 show graphs of exemplary voltage measurements made in accordance with the disclosed embodiments following the steps of the method disclosed in FIG. 2. In the exemplary graphs, voltage readings over a span of 20 feet of a well site were recorded to compare the plurality of voltage measurements, labeled as signals 61, 62, 63, 64, 65, 66, and 67 for each of the measurements at 0.1 Hz, 0.5 Hz, 1 Hz, 2

Figure 5:
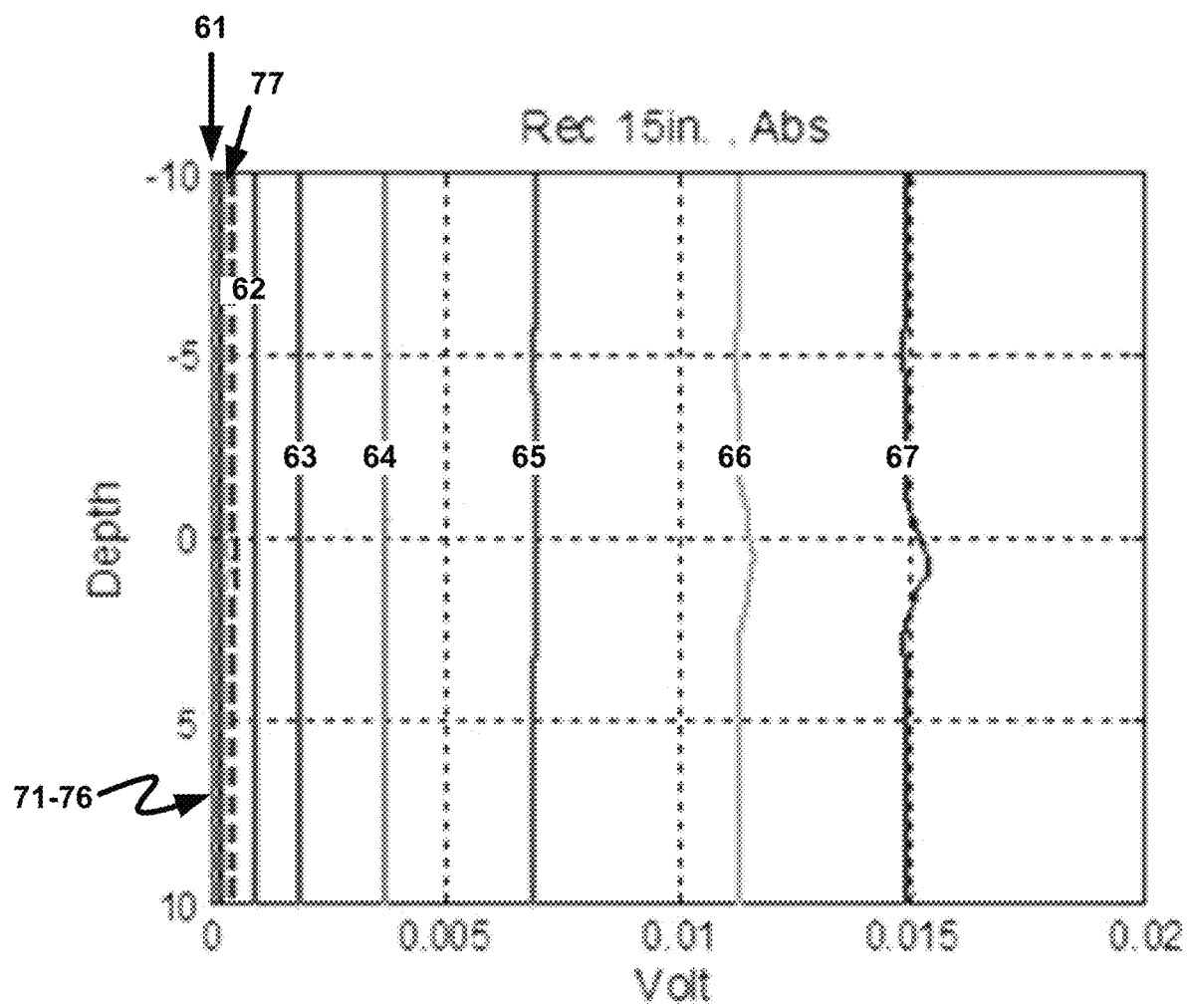
FIGS. 5-10 are exemplary graphs representing exemplary values of raw responses obtained with a corrosion detection tool with and without a core.
Figure 6:
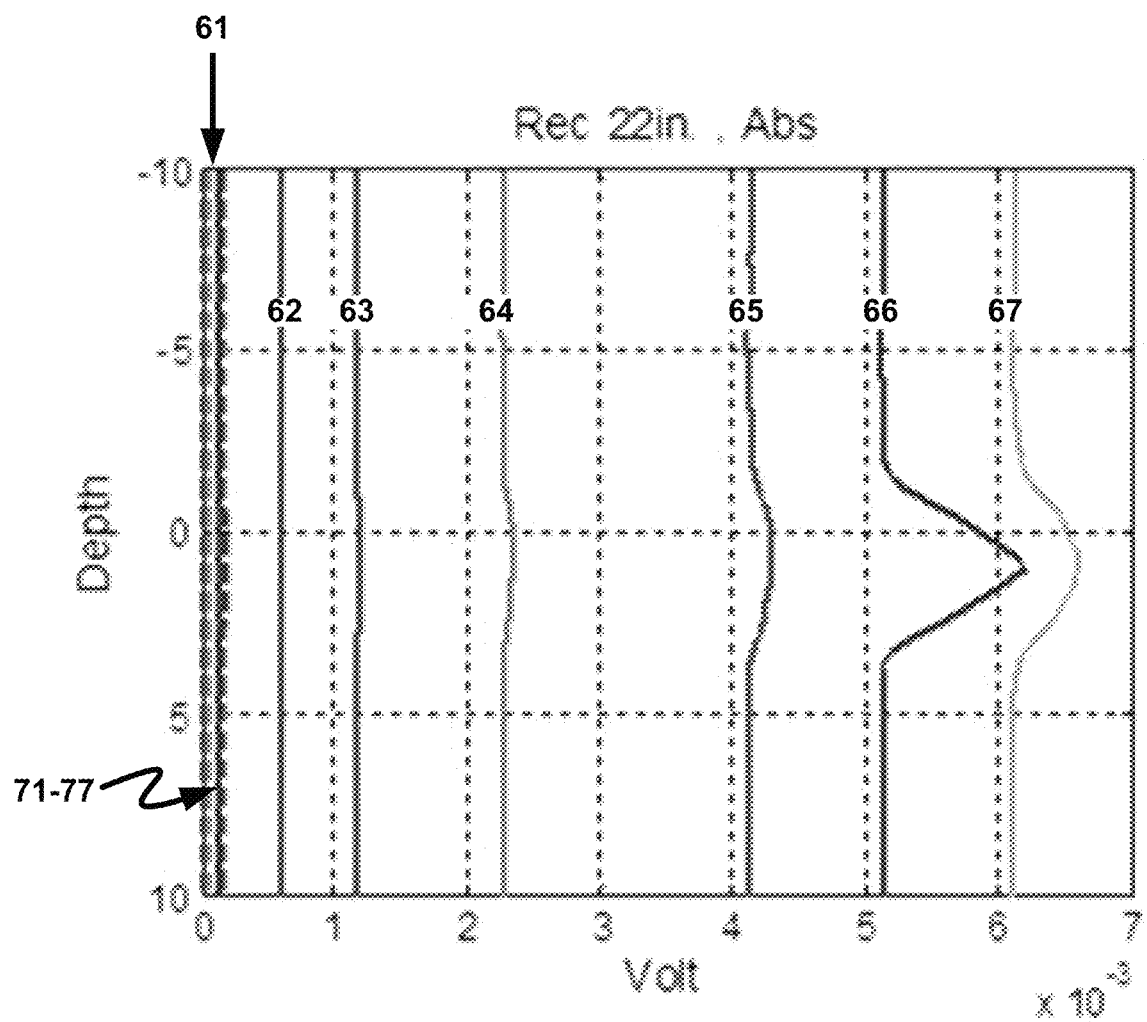
Figure 7:
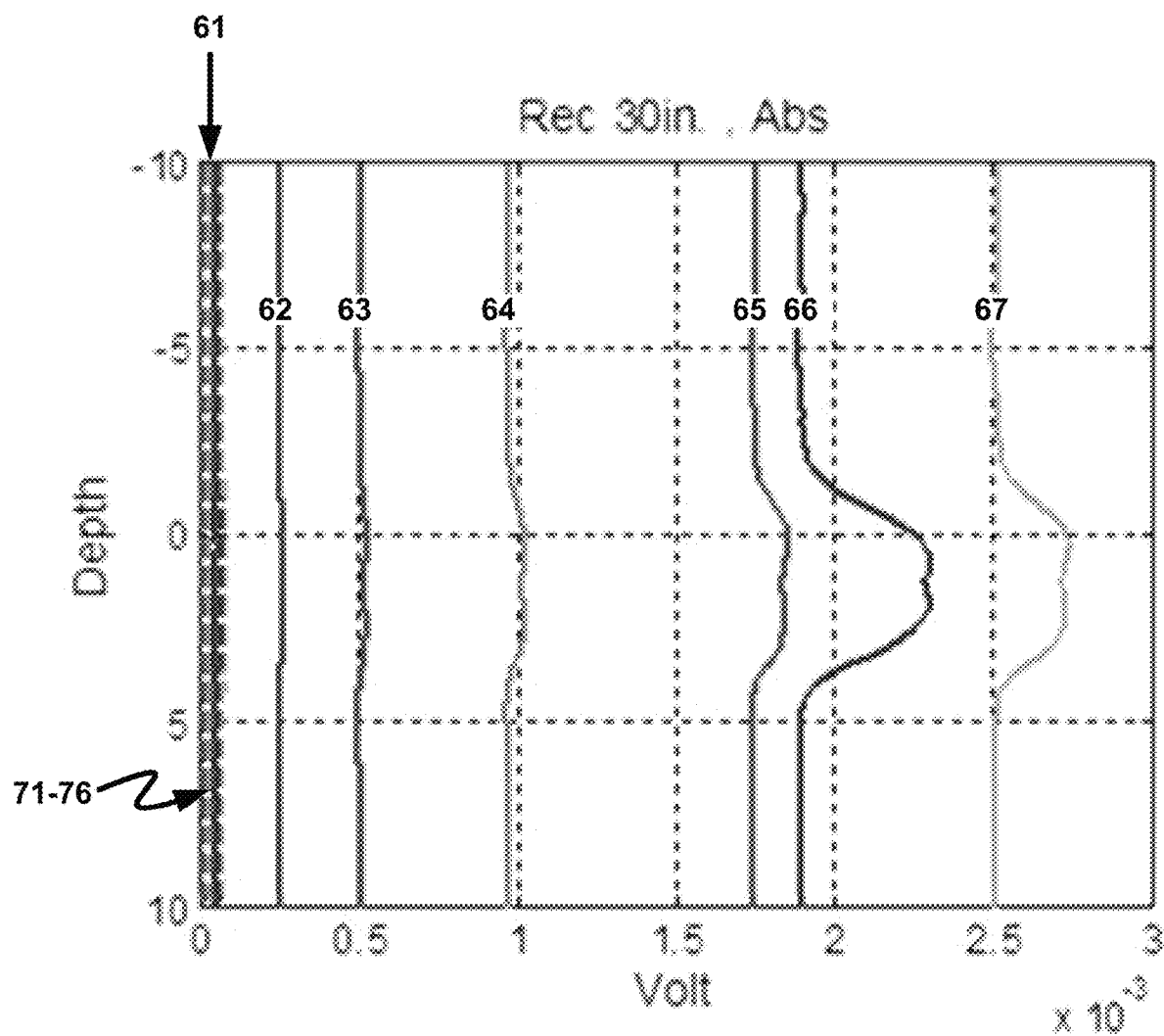

Hz, 4 Hz, 8 Hz, and 20 Hz, respectively, with and without a saturated core. FIGS. 5-7 show time-domain measurements while FIGS. 8-10 show frequency-domain measurements.

In the exemplary embodiment illustrated by FIG. 5, the saturated core signal 77 and the unsaturated core signal 67 evidence a significant amplification due to the presence of the core and measurement operation as disclosed. Likewise, the saturated core signals 71-76 and the corresponding unsaturated core signals 61-66, respectively, also evidence similar amplifications.

In the exemplary embodiments illustrated by FIGS. 6-7, the saturated core signals 71-77 are collected towards the portion of the plot where the lower signal measurement without a core 61 is visible. Again, the corresponding unsaturated core signals 62-67 evidence significant amplification due to the presence of the core and measurement operation as disclosed.

Figure 8:
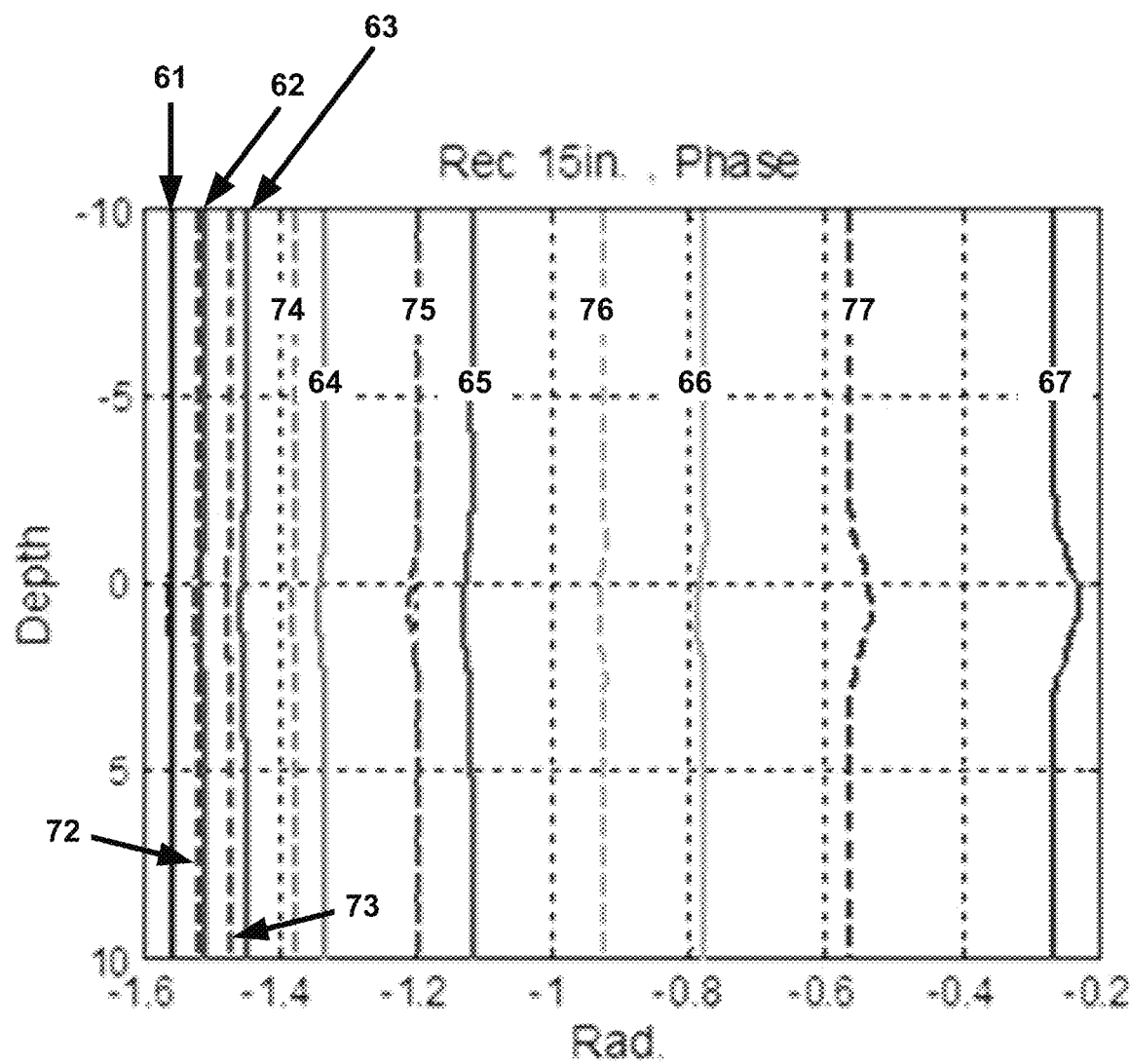
Figure 9:
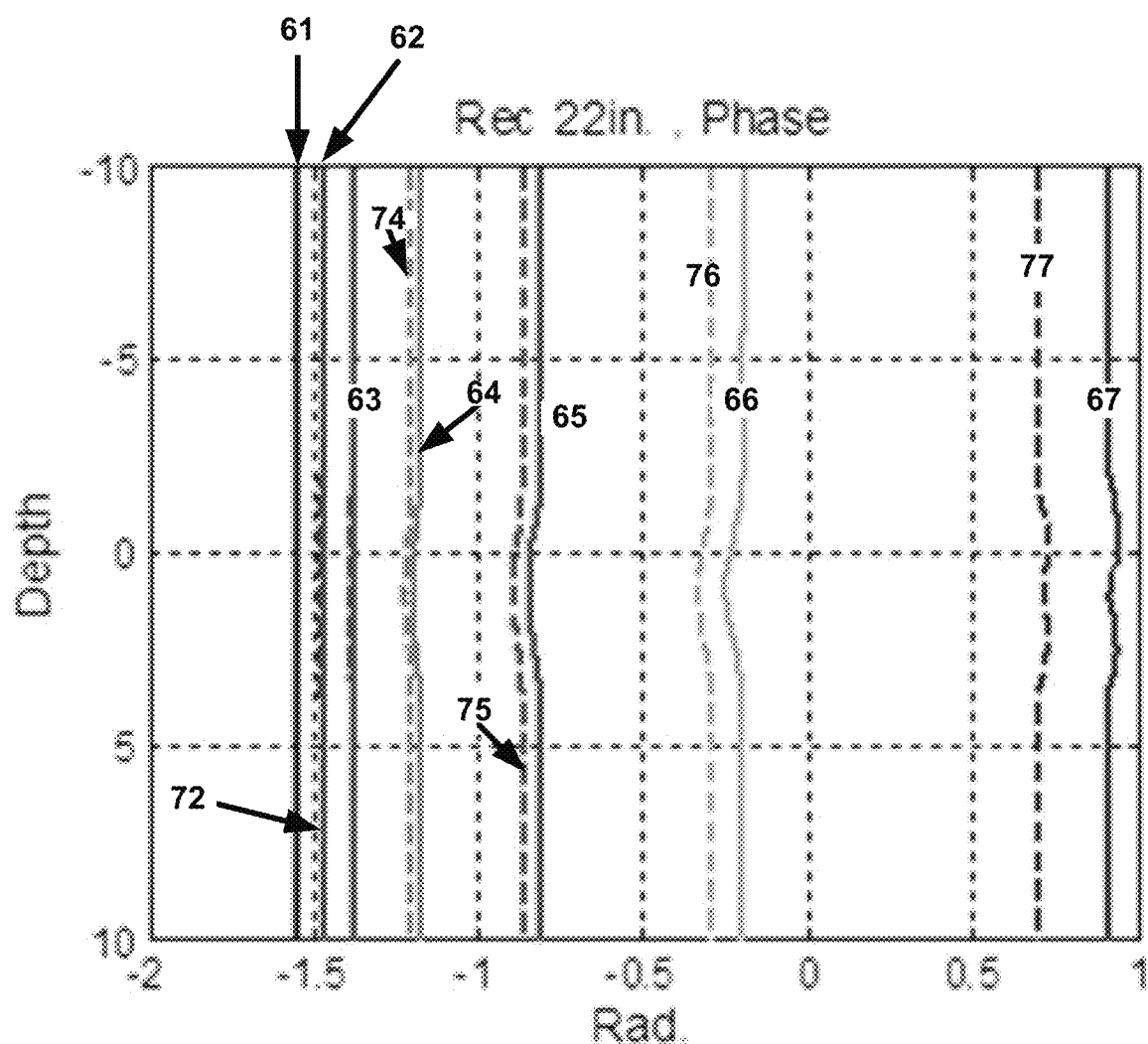
Figure 10:
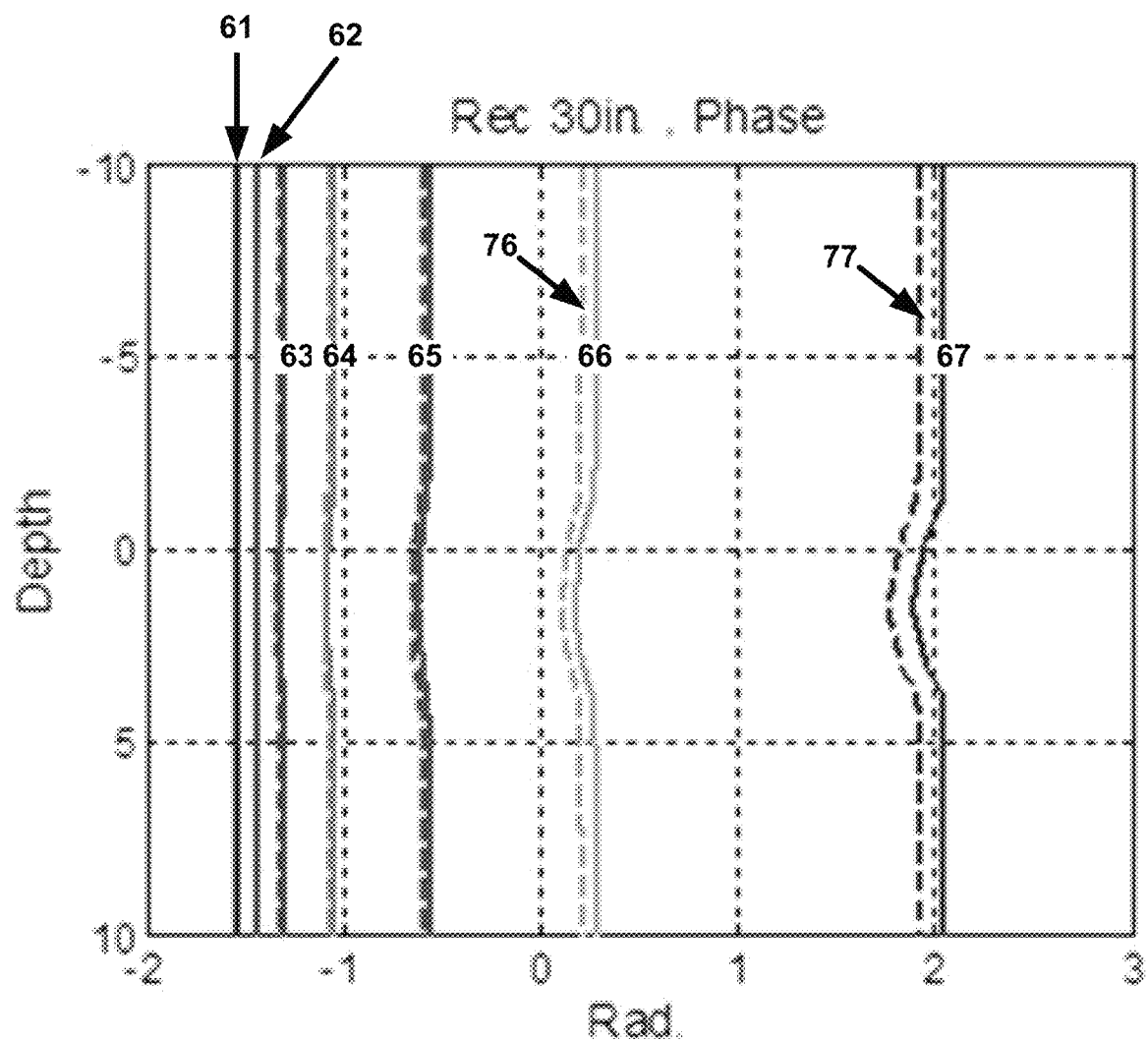

In the exemplary embodiments illustrated by FIGS. 8-9, a comparison of the saturated core signals 72-77 to the corresponding unsaturated core signals 62-67 evidence significant amplification due to the presence of the core and measurement operation as disclosed.

In the exemplary embodiments illustrated by FIG. 10, the saturated core signals 76-77 corresponding to unsaturated core signals 66-67, respectively, evidence significant amplification due to the presence of the core and measurement operation as disclosed.

In an exemplary embodiment, the presence of the core in the EM corrosion detection tool may boost signal levels by up to a factor of approximately 30, to improve detection and visibility of defects in the well line. Additionally, an exemplary calibration weight (i.e., coefficient) for an exemplary core (10, 305, 310, and 410) may be optimally determined along the substantially flat portions of the measurement signals obtained by the EM detection tool, e.g., the substantially vertical sections of signals 61-67 and signals 71-77.

The methods disclosed provide for estimations of the effect of a core (10, 305, 310, and 410) through direct division of saturated and unsaturated core responses. One advantage of the methods disclosed is that they may obviate the need for solving an inversion problem wherein prior knowledge of the pipe still results in several unknowns, e.g., an unresolvable equation. Another advantage of the methods disclosed is they may avoid the need for solving for pipe permeability simultaneously with making calibration weight measurements.

The disclosed methods and devices may be used in a calibration method that may be easily implemented in existing corrosion detection tools through minor modification to transmitter coil circuitry. Additionally, the aforementioned methods and devices may enable faster synthetic inversion models by matching measured responses with tools having 2-D geometries to radial 1-D synthetic models of those tools.

The disclosed methods and devices may also enable more accurate estimation of pipe permeability using a baseline measurement and pre-known information on the nominal thickness of the pipes following core effect calibration. The disclosed methods and devices may be applicable in both frequency-domain and time-domain corrosion detection tools.

Thus, the disclosed methods and devices provide a practical and efficient way to calibrate EM corrosion detection measurements to take into account and/or compensate for the effect of a magnetic core to significantly improve accuracy of inversion and allow better visualization of raw data.

In general, in one aspect, an exemplary well line detection method (200) may comprise the steps of: sending a first voltage to a core of a well tool disposed in the well line (step 205), logging at least one first signal while the first voltage is applied to the core (step 210); removing the first voltage from the core of the well tool while the tool is disposed in the well line (step 215); logging at least one second signal while the first voltage is removed from the core (step 225); and calibrating at least one measurement (step 235) using both the first signal and the second signal (step 230).

In one or more of the foregoing embodiments, calibrating comprises taking a product of the at least one measurement and one or more of the at least one first signal divided by one or more of the at least one second signal.

In one or more of the foregoing embodiments, the first voltage is applied at DC frequency.

In one or more of the foregoing embodiments, the well line detection method (200) may further comprise the step of determining at least one of a defect, such as corrosion, well line permeability, well line electrical properties, and well line metal content (step 235).

In one or more of the foregoing embodiments, the well line detection method (200) may use the average of a plurality of signals to generate the calibration constant used to calibrate future measurements using the well tool with the magnetic core.

In one or more of the foregoing embodiments, the well line detection method (200) may further comprise demagnetizing the core of the well tool (step 220), which demagnetizing may take place after removing the first voltage (step 215).

In one or more of the foregoing embodiments, the well line detection method (200) may be conducted in time or frequency domains.

In general, in another aspect, an electromagnetic detection system (300, 350, 400) for a well tool (450) may comprise a magnetic core (10, 305, 310, 410), at least one transmitter coil (420) disposed about the magnetic core; and at least one receiver coil (425a, 425b, 425c) spaced a predefined distance from the transmitter coil. The magnetic core may operate in saturated (53) and unsaturated (50) modes.

The electromagnetic detection system (300, 350, 400) for a well tool (450), further comprises a power source (301, 303) coupled to the well tool (450) to saturate the magnetic core (10, 305, 310, 410).

In one or more of the foregoing embodiments, the electromagnetic detection system (300, 350, 400) for a well tool (450), further comprises a second power source (303) coupled to the well tool to demagnetize the saturated magnetic core (10, 305, 310, 410).

In one or more of the foregoing embodiments, the electromagnetic detection system (300, 350, 400) for a well tool (450), wherein the at least one transmitter coil (420) and the at least one receiver coil (425a, 425b, 425c) are separate coils. (FIG. 4).

In one or more of the foregoing embodiments, the electromagnetic detection system (300, 350, 400) for a well tool (450), wherein the at least one transmitter coil (420) circumscribes and the at least one receiver coil (425a, 425b, 425c). The at least one receiver coil (425a, 425b, 425c) may also be disposed about the magnetic core (10, 305, 310, 410).

In one or more of the foregoing embodiments, the electromagnetic detection system (300, 350, 400) for a well tool (450), further comprises a calibration constant stored in a computer-readable medium resulting from at least one measurement (step 230) obtained using the well tool (450) with a saturated and unsaturated magnetic core (10, 305, 310, 410).

In one or more of the foregoing embodiments, the electromagnetic detection system (300, 350, 400) for a well tool (450), further comprising an amplified signal (61-67) received using a demagnetized saturated magnetic core (52*a*). In an exemplary embodiment, the amplified signal (61-67) may be amplified by a factor of about 30 as compared to a signal received using a saturated magnetic core (71-77).

In one or more of the foregoing embodiments, the electromagnetic detection system (300, 350, 400) for a well tool (450), wherein the magnetic core (10, 305, 310, 410) may be cylindrical in shape.

In one or more of the foregoing embodiments, the electromagnetic detection system (300, 350, 400) for a well tool (450), wherein the magnetic core (10, 305, 310, 410) is coupled in series to both the first power source (301) and the second power source (303).

In general, in yet another aspect, a well tool having an electromagnetic detection system according to one or more of the foregoing embodiments may be configured to log at least one first signal while a first voltage is applied to the saturable magnetic core and log at least one second signal while the first voltage is removed from the saturable magnetic core, wherein at least one measurement made by the well tool is calibrated using both the first signal and the second signal.

In one or more of the foregoing embodiments, the at least one measurement is calibrated by taking a product of the at least one measurement and one or more of the at least one first signal divided by one or more of the at least one second signal.

Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

What is claimed is:

1. An electromagnetic detection system for a well tool, comprising:
   a saturable magnetic core;
   at least one transmitter coil disposed around the saturable magnetic core; and
   at least one receiver coil spaced apart a predefined distance from the at least one transmitter coil.

2. The electromagnetic detection system for a well tool of claim 1, further comprising a first power source coupled to the well tool and connected to saturate the saturable magnetic core.

3. The electromagnetic detection system for a well tool of claim 2, further comprising a second power source coupled to the well tool and connected to demagnetize the saturable magnetic core.

4. The electromagnetic detection system for a well tool according to claim 1, wherein the at least one transmitter coil and the at least one receiver coil are separate coils.

5. The electromagnetic detection system for a well tool according to claim 1, wherein the at least one transmitter coil circumscribes the at least one receiver coil.

6. The electromagnetic detection system for a well tool according to claim 1, wherein the at least one receiver coil is disposed around the saturable magnetic core.

7. The electromagnetic detection system for a well tool according to claim 1, further including a computer-readable medium coupled with the saturable magnetic core, the computer-readable medium having a calibration coefficient stored therein resulting from at least one measurement obtained using the well tool with the saturable magnetic core.

8. The electromagnetic detection system for a well tool according to claim 1, wherein the saturable magnetic core may be cylindrical in shape.

9. The electromagnetic detection system for a well tool of claim 3, wherein the saturable magnetic core is coupled in series to both the first power source and the second power source.

10. A well tool having an electromagnetic detection system according to claim 1, the well tool configured to log at least one first signal while a first voltage is applied to the saturable magnetic core and log at least one second signal while the first voltage is removed from the saturable magnetic core, wherein at least one measurement made by the well tool is calibrated using both the first signal and the second signal.

11. The well tool of claim 10, wherein the at least one measurement is calibrated by taking a product of the at least one measurement and one or more of the at least one first signal divided by one or more of the at least one second signal.

12. The electromagnetic detection system for a well tool of claim 1, wherein the at least one receiver coil spaced apart a predefined distance from the at least one transmitter coil is a first receiver coil spaced a predefined first distance from the at least one transmitter coil, and further including a second receiver coil spaced apart a predefined second different distance from the at least one transmitter coil.

13. The electromagnetic detection system for a well tool of claim 12, wherein the predefined distance is 15 inches.

14. The electromagnetic detection system for a well tool of claim 13, wherein the predefined second distance is 22 inches.

15. The electromagnetic detection system for a well tool of claim 12, further including a third receiver coil spaced apart a predefined third different distance from the at least one transmitter coil.

16. The electromagnetic detection system for a well tool of claim 15, wherein the predefined distance is 15 inches, the predefined second distance is 22 inches, and the predefined third distance is 30 inches.

17. The electromagnetic detection system for a well tool of claim 1, wherein the saturable magnetic coil has a relative permeability of 70.

18. The electromagnetic detection system for a well tool of claim 1, wherein the saturable magnetic coil has a conductivity of 0.01 S/m.

* * * * *